United States Patent [19]
Dorville

[11] 3,831,911
[45] Aug. 27, 1974

[54] APPARATUS FOR THE AGGLOMERATION OF ORE

[75] Inventor: Robert Dorville, Paris, France

[73] Assignee: Delattre-Levivier, Paris, France

[22] Filed: June 29, 1973

[21] Appl. No.: 374,997

[30] Foreign Application Priority Data
July 26, 1972 France .............................. 72.26829

[52] U.S. Cl. ........................................ 266/21, 75/5
[51] Int. Cl. ............................................. F27b 9/14
[58] Field of Search ............... 432/85; 266/21; 75/5

[56] References Cited
UNITED STATES PATENTS

| | | | |
|---|---|---|---|
| 1,083,252 | 12/1913 | Hall | 266/21 |
| 1,181,244 | 5/1916 | Payne | 75/5 |
| 1,575,852 | 3/1926 | McCormack | 75/5 |
| 2,006,368 | 7/1935 | Reid | 266/21 |
| 2,498,766 | 2/1950 | Pettigrew | 266/21 |
| 3,249,422 | 5/1966 | Sironi et al. | 266/21 |
| 3,285,706 | 11/1966 | Cake | 432/85 |

FOREIGN PATENTS OR APPLICATIONS

| | | | |
|---|---|---|---|
| 621,462 | 6/1961 | Canada | 266/21 |

*Primary Examiner*—Gerald A. Dost
*Attorney, Agent, or Firm*—Cameron, Kerkam, Sutton, Stowell & Stowell

[57] ABSTRACT

A plant for the agglomerate of ore, comprising a movable chain passing through an ore cooling zone includes means located in the cooling zone for spraying onto the upper surface of the hot ore a cooling fluid which can be entrained by air passing through the layer ore. The spray cooling part of the cooling zone may be located between two air cooling parts. The cooling fluid may be water.

9 Claims, 1 Drawing Figure

PATENTED AUG 27 1974 3,831,911
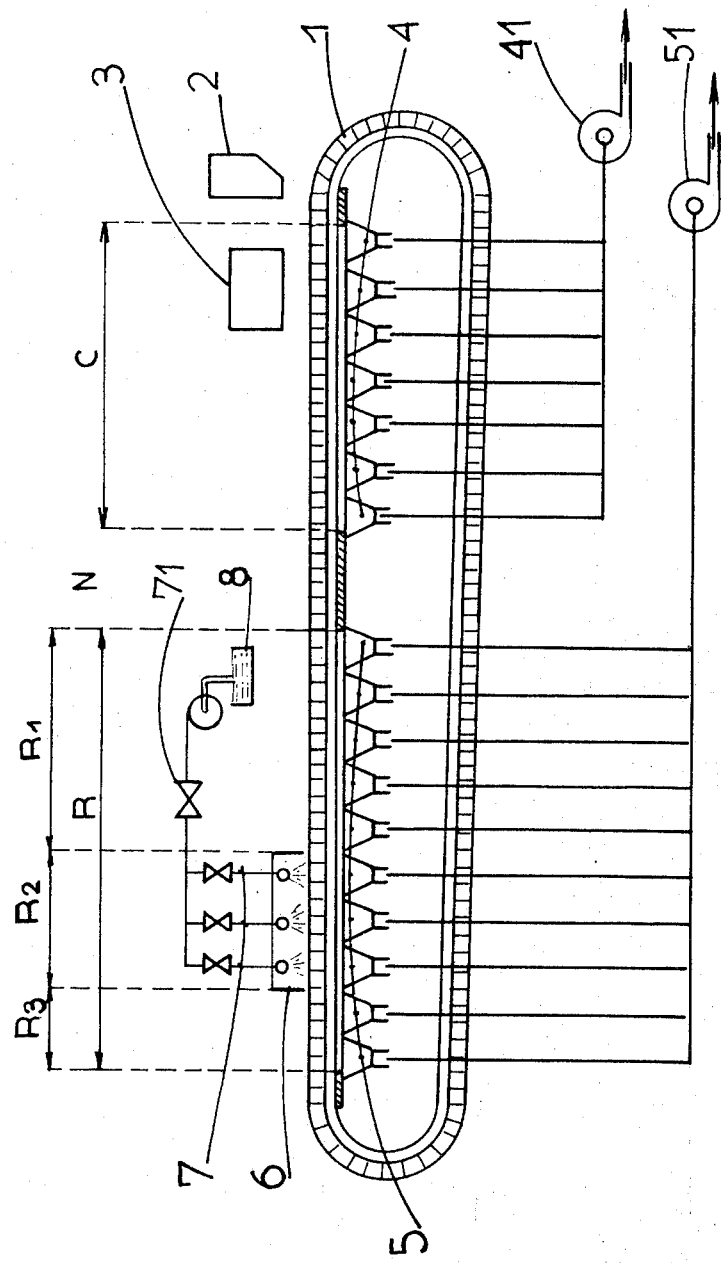

APPARATUS FOR THE AGGLOMERATION OF ORE

The invention relates to improvements to plants for agglomeration of ore. Such plants often include a mobile, continuous chain, an apparatus for pouring a layer of ore onto the said chain and means for igniting the upper portion of the layer of ore. These plants are also often provided with a ventilation system which can provide forced passage of air downwards through the said layer of ore, along the chain. This ventilation facilitates roasting of the ore thus ignited at the beginning of the chain and formation of a "cake" of agglomerate.

In known plant, the ore thus agglomerated was tipped off at the end of the chain, crushed and cooled. However, it has been proposed to lengthen the chain so that the cake of agglomerate can be cooled "in situ" by air aspirated by a special circuit in the ventilation system.

Transfer of heat contained in the cake to the cooling air passing through it is mainly effected by convection, conduction only acting to bring heat from inside the pieces of agglomerate towards the walls of fissures and cracks cooled by contact with the air It is known that during roasting a flame front is produced in the layer of ore deposited on the chain, which front spreads uniformly downwards until the moment, at the end of roasting, when it reaches the bars of the grids of the chain trollies. Given that roasting is sustained by aspiration of air through the cake, cooling of the agglomerate immediately follows the flame front and also spreads uniformly downwards to the end of the roasting zone. It is at this moment that the so-called "in situ" cooling commences.

Cooling on the chain yields a better quality product and, moreover, has the important advantage that a fairly low-temperature agglomerate is tipped onto the crushers and screens which follow the chain, which enables wear of the material to be much reduced, abrasion being must greater at high temperatures. The cost of maintaining and repairing the plant is thus reduced. However, it is obvious that the chain must be lengthened to take into account the cooling zone, which increases the cost and size of the chain.

According to the present invention there is provided a plant for the agglomeration of ore comprising a continuous mobile chain which passes through successive ore roasting and ore cooling zones, an apparatus for pouring a layer of ore onto the said chain, means for igniting the upper portion of the layer of ore, a ventilation system which can provide a forced, downward passage of air through the said layer of ore along the chain, and apparatus located in the cooling zone for spraying onto the upper surface of the layer of agglomerate a cooling fluid which can be entrained by air passing through the layer of agglomerate.

The cooling zone may comprise successively, in the direction of motion of the chain, a first, air-only, pre-cooling portion, a second, intensive cooling portion, in which the apparatus for spraying cooling fluid is positioned, and a third, air-only, final cooling portion.

The invention will be better understood from the following description of a particular embodiment thereof, given by way of example only, and illustrated in the attached drawing, wherein the single FIGURE is a diagram of a plant for agglomeration of ore.

The plant includes a conventional agglomeration chain which consists, in known manner, of a series of trollies forming a closed chain 1, the said trollies being provided with bars on which a hopper 2 deposits the ore so as to form a layer of uniform thickness.

The layer thus formed then passes under an ignition hood 3, in which a burner ignites the upper portion of the ore. Combustion is activated by passage of air aspirated by a series of roasting boxes 4, connected to a suction fan 41 and defining the roasting zone (C). The portion of ore which is on fire constitutes a flame front which spreads uniformly downwards until the moment when it reaches the bars of the grids of the trollies, the ore then being completely roasted and forming what is known as the "cake" of agglomerate.

Taking into account the roasting conditions (nature of the ores, thickness of the layer, chain velocity, etc.) the length of the roasting zone (C) is such that the roasting point corresponding to the moment when the flame front reaches the bars of the grids is positioned at the height of the last roasting box 4.

The cake of agglomerate then passes over a series of boxes 5 connected to a suction fan 51 and constituting the cooling zone (R), the beginning of which is separated from the end of the roasting zone (C) by a neutral cap (N) which, in particular, separates aspiration circuits 4 and 5.

In accordance with the invention, a portion of the cooling zone (R), defined by an upwardly and downwardly open box 6, is provided with an apparatus 7 for applying a cooling fluid 8 onto the cake of agglomerate. The spraying apparatus can consist, for example, of a series of spraying banks positioned at a certain distance from the ore, perpendicularly to the longitudinal axis of the chain, and spaced apart, the said banks being supplied with fluid by a pump. The cooling fluid is preferably water.

This spraying of water onto the cake does not have the deleterious consequences which might be expected for the quality of the cake. In fact, as has been observed, the cooling of the agglomerate immediately follows the flame front and, therefore, spreads regularly downwards as it is in the roasting zone, so that in the cooling zone the aspirated air continues to remove the calories which the cake still contains, mainly in its lower portion, where the thermal potential is still fairly high. In fact, if the mean temperature of the cake of agglomerate after the roasting phase varies from 400° to 650° (depending on the ores treated, the base value of the agglomerate and the thickness of the layer), on the other hand the maximum temperaure of the zone situated above the ores, representing ¼ to ⅓ of the total height of the layer is much higher, as it varies from 600° to 1,000° depending on the working conditions. It is principally the cooling of this zone which characterises the process of cooling the agglomerate on the chain.

In these conditions, the water vaporised over the cake firstly reaches the coldest upper portion which, for example, can be at a temperature of 200°. As it passes through the cake with the aspirated air, the water becomes hot and is then vaporised and, finally, super-heated. The hottest portion of the cake is therefore protected from the water by the upper portion. Moreover, the very endothermic phase change of the water ensures particularly efficient cooling.

Furthermore, it has been established, by studying the agglomerate cake cooling process as a function of the flows of air passing through it, that the agglomerate firstly cools rapidly to a certain temperature, and that the transfer of calories to the air then becomes slower and slower progressively as the temperature differential between the agglomerate and the air decreases. It is therefore the final cooling phase which is the longest and thus requires a large chain area compared with that required by calory loss at a higher thermal potential. Box 6, defining the intensive cooling portion will therefore be positioned after a pre-cooling zone (R1) for which cooling by air alone has good efficiency, taking into account the temperature differential between the air and the agglomerate.

The length of the pre-cooling zone (R1) will be so determined that at the end of this zone the agglomerate temperature will be such that there is no longer a risk of undergoing quenching on contact with the cooling fluid. Moreover, so that the agglomerate is dry when it leaves the chain, a certain portion (R3) of the cooling area, before discharge, is reserved, through which non-humidified air is aspirated. This final cooling portion (R3) is of sufficient length for the water which has not been vaporised in the upper, already cool portion of the cake to be entrained towards the lower, hotter zone, where it can still be evaporated, so that the sprayed water is completely vaporised before discharge of the agglomerate at the end of the chain.

Preferably, the fluid spray banks 7 are each provided with an independent flow regulating means, which enables the spray of each bank to be controlled as a function of the temperature of the cake at the height of this bank. It will therefore be possible to effect a weak spray through the first bank, so as not to risk sealing the agglomerate, then to increase the spray in the central portion of R2 and finally to decrease the flow of the last bank so that, taking into account the temperature of the cake at the end of the chain, the water sprayed at the end of portion R2 can be eliminated.

A main valve 71 enables the total water flow to be controlled. By arranging a certain number of uniformly spaced banks above the chain, the cooling intensity can easily be controlled by monitoring the temperature of the air aspirated by each box. Water spraying will commence at a moment when the cake is no longer red. For rich ores, this moment corresponds to an air temperature of 250° to 300°.

The temperature and humidity of the agglomerate will also be controlled on discharge at the end of the grid. The temperature of the agglomerate on discharge, the temperature of the air in the different cooling boxes, and the flow-rate of the water could form part of a control loop.

It has been established that the improvements in accordance with the invention enable the length of the cooling zone to be reduced by 15 to 20 percent.

Of course, the invention is not limited to the details of the embodiment which has only been given by way of example; on the contrary, it extends to modifications which would only differ from it in detail or by the use of equivalent means.

Thus water, selected because of its high cooling power, could however be replaced by any other agent having a higher cooling power than air, either by its specific heat coefficient or by an endotheric physical change.

I claim:

1. A plant, for the agglomeration of ore, comprising a continuous mobile chain which passes through successive ore roasting and ore cooling zones, an apparatus for pouring a layer of ore onto the said chain, means for igniting the upper portion of the layer of ore, a ventilation system which can provide a forced, downward passage of air through the said layer of ore along the chain, apparatus located in the cooling zone for spraying onto the upper surface of the layer of agglomerate a cooling fluid which can be entrained by air passing through the layer of agglomerate, wherein the cooling zone comprises successively, in the direction of motion of the chain, a first, air-only, pre-cooling portion, a second, intensive cooling portion in which the apparatus for spraying cooling fluid is positioned and a third, air-only, final cooling portion.

2. A plant in accordance with claim 1, wherein the first, pre-cooling portion substantially comprises the first half of the cooling zone.

3. A plant in accordance with claim 1 wherein the intensive cooling portion begins at a place in the cooling zone at which the agglomerate has reached such a temperature that there is no longer a risk of undergoing quenching on contact with the cooling fluid.

4. A plant in accordance with claim 1, wherein the final cooling portion is of sufficient length for the cooling fluid sprayed onto the agglomerate to be completely vaporised before discharge of the agglomerate at the end of the chain.

5. A plant in accordance with claim 1, wherein the cooling fluid is a substance which can undergo an endothermic physical change at the temperatures reached by the ore on the chain.

6. A plant in accordance with claim 1, wherein the cooling fluid is a substance having a high specific heat coefficient.

7. A plant in accordance with claim 1, wherein the cooling fluid is water.

8. A plant in accordance with claim 1, wherein the spraying apparatus comprises a series of spraying banks positioned at a certain distance from the ore, transversally of the longitudinal axis of the chain and spaced apart from each other, the flow rate of each of the said banks being adjustable.

9. A plant in accordance with claim 8, wherein the flow-rate of the spray banks forms part of a control loop into which the temperature of the air which has passed through the cake, measured at different points in the cooling zone, is inserted.

* * * * *